J. K. Mayo,

Construction of Trunks.

No. 3090. Reissued Aug. 18. 1868.

Witnesses.
Ph. B. Dewing
W. H. Brewster

John K. Mayo
By Knighton & Co
Attys.

United States Patent Office.

JOHN K. MAYO, OF NEW YORK, N. Y., FOR HIMSELF, AND ANDRE CUSHING AND GEORGE B. CUSHING, OF ST. JOHN, NEW BRUNSWICK, ASSIGNEES OF JOHN K. MAYO.

*Letters Patent No.* 51,785, *dated December* 26, 1865; *reissue No.* 3,090, *dated August* 18, 1868.

DIVISION F.

IMPROVEMENT IN THE CONSTRUCTION OF BOXES, TRUNKS, BUCKETS BARRELS, AND OTHER CONTAINING VESSELS.

The Schedule referred to in these Letters Patent and making part of the same.

TO ALL WHOM IT MAY CONCERN:

Be it known that JOHN K. MAYO, formerly of Portland, Maine, but now of the city, county, and State of New York, has invented an Improvement in Boxes, Cases, Moulds, and other Containing-Vessels; and it is hereby declared that the following is a sufficiently full, clear, and exact description thereof, to enable one skilled in the art to which the said invention appertains to carry it into effect, reference being had to the accompanying drawings which are made a part of this specification.

The invention consists in constructing various boxes, cases, moulds, and other containing-vessels of a plurality of thin sheets or veneers of wood, cemented or otherwise firmly connected together, with the grain of the several scales or thicknesses crossed or diversified, so that they will afford to each other mutual support, strength, and protection against checking and splitting, swelling or shrinking.

This material is peculiarly adapted to the manufacture of travelling-trunks and valises.

The preferable process of manufacture is, having treated the scale-board with cement, to lay up the successive layers within the desired form till a suitable thickness is obtained, then to introduce an interval form, so made as to be capable of expansion, and thus compress the several layers between the two forms till their surfaces adhere firmly to each other. The ends may then be put in, in any of the usual methods, being of the same material, and laid up to proper thickness, and compressed by lever, screw, or wedge, in plain flat surfaces or in ornamental figures or panels.

This is a cheap and durable substitute for the leather as well as the common wooden trunk.

Coffins or burial-cases made of this material may answer all the purposes of metallic cases, being equally tight and strong, and from which the air may be exhausted, constituting it an air-tight receiver.

Packing-cases for valuable goods may be made air and water-proof with comparatively little more cost than the present weak and insecure cases.

In the drawings—

Figure 1:
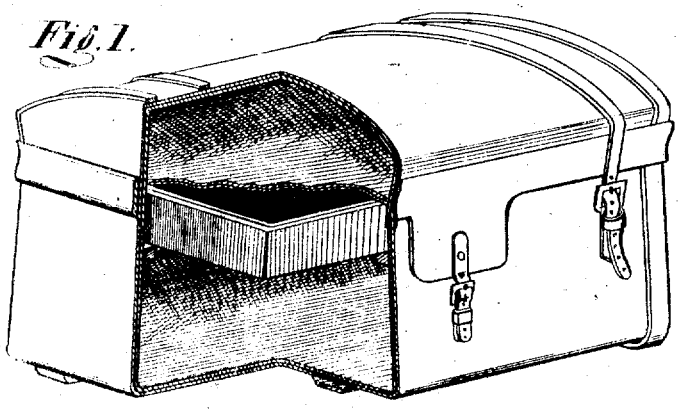
Figure 1 represents a perspective view, partly in section, of a travelling-trunk made after this invention.
Figure 2:
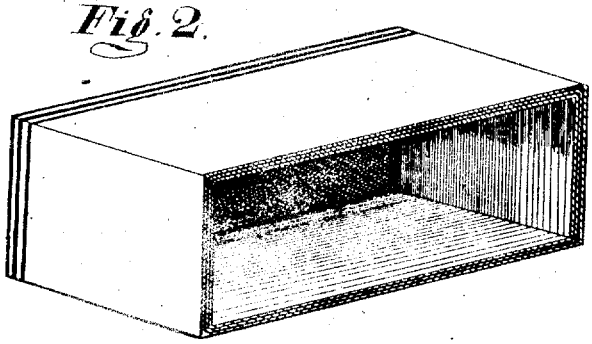
Figure 2 is a perspective sectional view of a packing-case.
Figure 3:
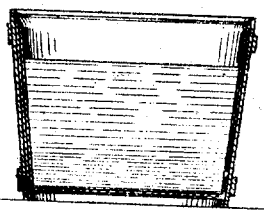
Figure 3 is an axial sectional view of a bucket.

All these articles are formed of a plurality of scales or laminæ, *a a′ a″*, the direction of the grain of the wood in some being diverse from that in others.

The invention is also applicable to the manufacture of travelling-bags, cartridge-boxes, troughs, buckets, kegs, firkins, ice-cream freezers, ice-chests, meat-safes, refrigerators, flour-scoops, measures, bowls, trays, ladles, spoons, tea-chests and caddies, hat and bonnet-boxes, baskets, cradles, and a great many other receptacles.

The following is claimed as new in the invention of JOHN K. MAYO:

The employment or use of the compound scale-board, hereinbefore described, in the formation of the specified or analogous receptacles or parts thereof.

JOHN K. MAYO.

Witnesses:

EDWARD WILLARD,

S. W. FROST.